United States Patent [19]

Hotta

[11] 3,821,477

[45] June 28, 1974

[54] SYSTEM FOR MULTIPLEX TRANSMISSION OF ELECTRICAL SIGNALS UTILIZING SYNCHRONIZED RING COUNTERS

[75] Inventor: Yoichi Hotta, Nagoya, Japan

[73] Assignee: Kabushiki Kaisha Tokai Rika Denki Seidakusho, Nishikasugai-gun, Japan

[22] Filed: Aug. 7, 1972

[21] Appl. No.: 278,410

[30] Foreign Application Priority Data

Aug. 7, 1971 Japan ............................... 46-59826
Aug. 7, 1971 Japan ............................... 46-59827

[52] U.S. Cl. .......................... 179/15 A, 179/15 BL
[51] Int. Cl. ............................................. H04j 3/04
[58] Field of Search ....... 179/15 A, 1 B; 307/223 R, 307/243; 332/9 T, 15 BL

[56] References Cited

UNITED STATES PATENTS

| | | | |
|---|---|---|---|
| 2,617,931 | 11/1952 | Trousdale | 179/15 A |
| 2,999,129 | 9/1961 | Lynch | 179/15 A |
| 3,566,038 | 2/1971 | Slavin | 179/15 A |
| 3,651,454 | 3/1972 | Venema | 340/184 |

OTHER PUBLICATIONS

Electronics, March 1947 issue, pp. 101–105.

*Primary Examiner*—Kathleen H. Claffy
*Assistant Examiner*—David L. Stewart
*Attorney, Agent, or Firm*—Woodhams, Blanchard & Flynn

[57] ABSTRACT

A system and an apparatus for multiplex transmission of electrical signals via a single signal line. In a transmitter and a receiver, "on" positions of ring counters thereof are sequentially shifted in synchronism with each other by a clock pulse generating circuit and a resetting circuit. Means are provided for converting *n* electrical signals to output voltages of the respective stages of *n*-stage ring counter in the transmitter and for sequentially applying said output voltages to the corresponding stages of the read counter in the receiver, through said single signal line, upon every shifting of the "on" position of the ring counter of the transmitter.

13 Claims, 6 Drawing Figures

PATENTED JUN 28 1974

3,821,477

SYSTEM FOR MULTIPLEX TRANSMISSION OF ELECTRICAL SIGNALS UTILIZING SYNCHRONIZED RING COUNTERS

This invention relates to multiplex transmission system of electrical signals which permits to transmit multiple simple electrical signals such as voltage signals, logical signals or the like via a single signal wire and to discriminate said signals from each other in a receiver.

Conventionally, there have been provided PCM, PAM, time-division multiplex and frequency-division multiplex systems for transmitting a multiplicity of electrical signals via a reduced number of signal wires. In those systems, however, installation cost was extremely expensive in view of their complicated structure in circuit and mechanisms. Thus, such systems are too expensive to be employed for transmitting simpler electrical signals through short distance, though they might be applicable to a large scale communication system, such as a telephone communication system.

The present invention has been made to solve the above problem and it is therefore an object of the present invention to provide a multiplex transmission system of electrical signals which is composed only of simple circuits and can be manufactured easily and at a low cost.

It is another object of the present invention to provide a multiplex transmission system of electrical signals which permits arbitrary design of circuit depending upon the number of signals to be transmitted and hence permits increase or decrease of circuits, relatively easily according to necessity.

It is a further object of the present invention to provide an apparatus for multiplex transmission of electrical signals which is capable of transmitting voltage corresponding to resistance, voltage corresponding to analog voltage, or the like through simple circuit.

It is a still further object of the present invention to provide an apparatus for multiplex transmission of electrical signals in which n resistance sources whose resistance values are variable selectively by the operation of multipole switches are included in a transmitting station as a signal source, and drive circuit therefor as well as a plurality of loads are connected in a receiving station, whereby connection and disconnection between a set of switches and a set of loads in, for example, automobiles or the like is controlled via a single signal line and a single power supply line.

It is a still further object of the present invention to provide an apparatus for multiplex transmission of electrical signals, which permits arbitrary design of circuit depending upon the number of signals to be transmitted facilitating increase or decrease circuit relatively easily according to necessity.

The present invention will now be described in conjunction with the accompanying drawings illustrating a perferred embodiment of the present invention, in which.

Figure 1:
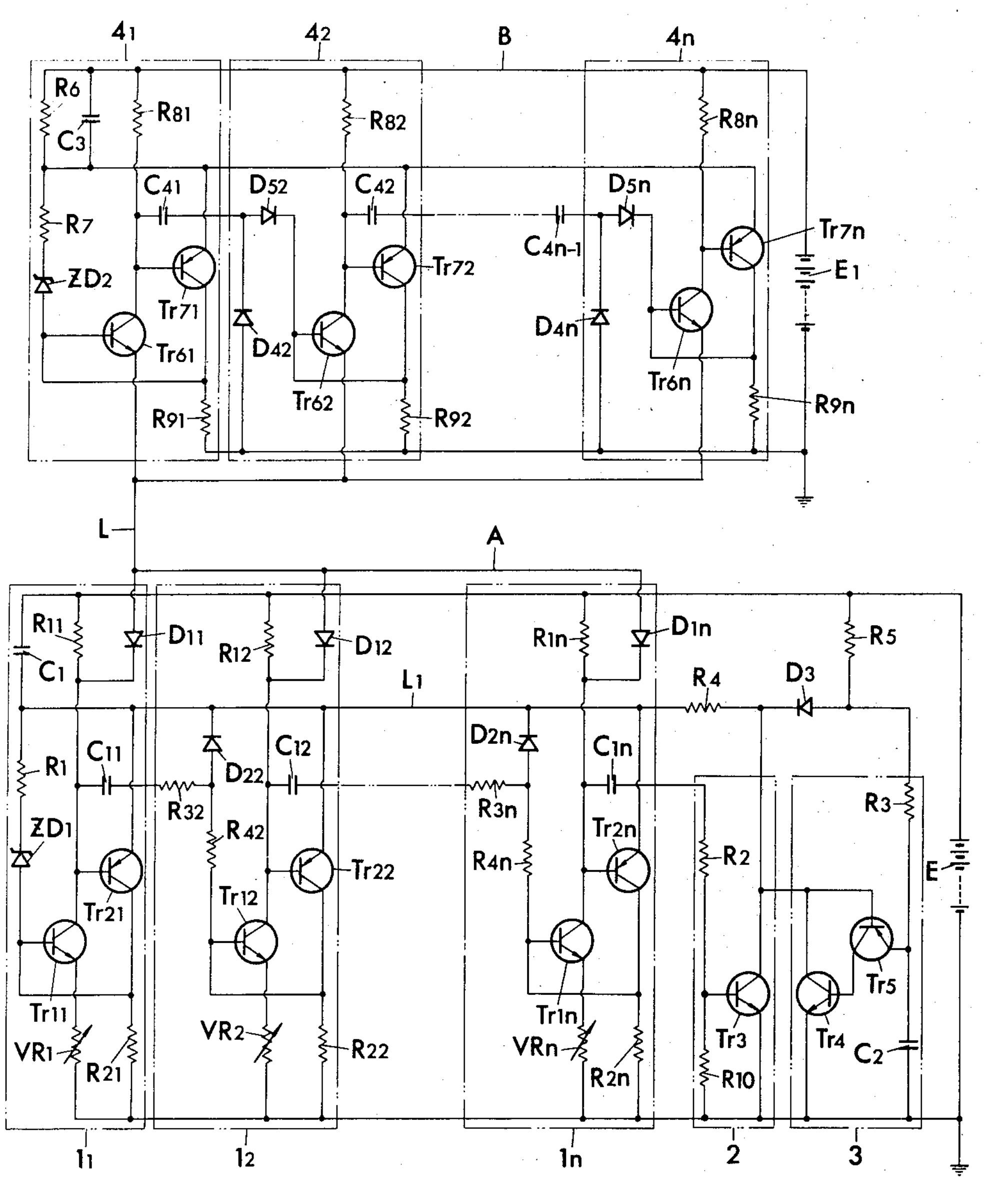
FIG. 1 shows a basic electric circuit.
Figure 3:
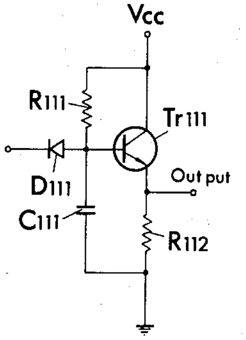
Figure 4:
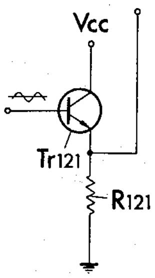
Figure 5:
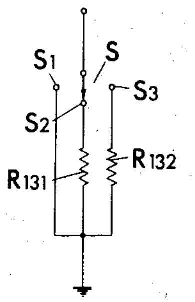
Figure 6:
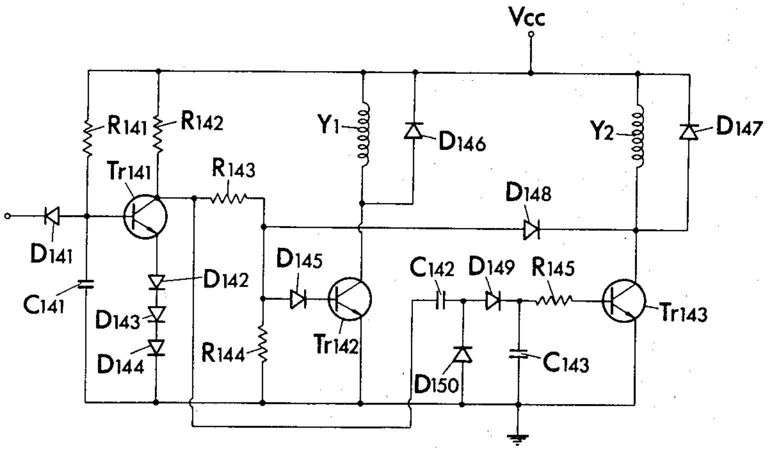

FIGS. 3 to 6 show circuit diagrams employable for various purposes in combination with the circuit of FIG. 1; wherein FIG. 3 shows an output circuit to be connected with a receiver; FIG. 4 shows an input circuit to be connected to a transmitter; FIG. 5 shows a switch circuit to be connected to the transmitter and FIG. 6 shows a driver circuit to be connected to the receiver.

Referring first to FIG. 1 which is a basic circuit diagram of the present invention, there is illustrated a transmitter A connected with a receiver B via a single signal line L. The transmitter A comprises a ring counter having n stages $1_1$, $1_2$, . . . $1_n$ (n is an integer of two or more), a resetting circuit 2 and a clock pulse generating circuit 3. The receiver B comprises a ring counter having the same number of stages $4_1$, $4_2$ . . . $4_n$ as those of the ring counter in the transmitter A.

A first stage $1_1$ of the ring counter in the transmitter A is composed of capacitors $C_1$ and $C_{11}$, resistors $R_1$, $R_{11}$ and $R_{21}$, a variable resistor $VR_1$, a diode $D_{11}$, a Zener diode $ZD_1$ and transistors $Tr_{11}$ and $Tr_{21}$, and a second stage $1_2$ of said ring counter is connected through said capacitor $C_{11}$. Said second stage $1_2$ is composed of a capacitor $C_{12}$, resistors $R_{12}$, $R_{22}$, $R_{32}$ and $R_{42}$, a variable resistor $VR_2$, diodes $D_{12}$ and $D_{22}$ and transistors $Tr_{12}$ and $Tr_{22}$. Other succeeding stages are similarly constructed but a final stage $1_n$ is composed of a capacitor $C_{1n}$, resistors $R_{1n}$, $R_{2n}$, $R_{3n}$ and $R_{4n}$, a variable resistor $VR_n$, diodes $D_{1n}$ and $D_{2n}$, and transistors $Tr_{1n}$ and $Tr_{2n}$. Each stage of the ring counter is coupled with a capacitor of respective preceding stage (for example, a third stage of the ring counter is coupled with the capacitor $C_{12}$ in the second stage $1_2$). The capacitor $C_{1n}$ is so selected that it has sufficiently larger capacitance than those of capacitors $C_{11}$, $C_{12}$, and $C_{1n-1}$ in the preceding stages.

A resetting circuit 2 comprising resistors $R_2$ and $R_{10}$ and a transistor $Tr_3$ is coupled with the final stage $1_n$ of the ring counter through the capacitor $C_{1n}$.

Connected to a collector of the transistor $Tr_3$ in the resetting circuit 2 is a clock pulse generating circuit 3 comprising transistors $Tr_4$ and $Tr_5$, a resistor $R_3$ and a capacitor $C_2$. E designates a power supply, $R_4$ $R_5$ resistors and $D_3$ a diode, respectively.

In the receiver B, a first stage $4_1$ of the ring counter is composed of capacitors $C_3$ and $C_{41}$, resistors $R_6$, $R_7$, $R_{81}$ and $R_{91}$, a Zener diode $ZD_2$, and transistors $Tr_{61}$ and $Tr_{71}$, and a second stage $4_2$ of said ring counter is coupled therewith via said capacitor $C_{41}$. Said second stage $4_2$ of the ring counter is composed of a capacitor $C_{42}$, resistors $R_{82}$ and $R_{92}$, diodes $D_{42}$ and $D_{52}$, and transistors $Tr_{62}$ and $Tr_{72}$. The succeeding stages are constructed in similar way but the final stage $4_n$ which is composed of resistors $R_{8n}$ and $R_{9n}$, diodes $D_{4n}$ and $D_{5n}$ and transistors $Tr_{6n}$ and $Tr_{7n}$. Each stage of the ring counter is connected to a capacitor of the preceding stage, respectively. $E_1$ designates a power supply and $C_{4n-1}$ represents a capacitor of a stage immediately preceding the final stage $4_n$ of the ring counter.

The operation of the circuit assembly thus constructed is now described. Pairs of transistors $Tr_{11}$ and $Tr_{21}$; $Tr_{12}$ and $Tr_{22}$ . . . $Tr_{1n}$ and $Tr_{2n}$ and $Tr_{61}$ and $Tr_{71}$; $Tr_{62}$ and $Tr_{72}$; . . . $Tr_{6n}$ and $Tr_{7n}$ constitute conventional ring counters and they are so designed that when either one of the transistors constituting such a pair is turned on, the other is also turned on by virtue of positive feedback and that when either one of the transistors is turned off, the other is also turned off. Each of said pairs of transistors $Tr_{12}$ and $Tr_{22}$; . . . $Tr_{1n}$ and $Tr_{2n}$ and $Tr_{62}$ and $Tr_{72}$; . . . $Tr_{6n}$ and $Tr_{7n}$ is adapted to be turned on only when a positive pulse is applied through a capacitor coupled to the respective preceding stages (for example, a pair of transistors $Tr_{12}$, $Tr_{22}$ are turned on by a positive pulse applied through the capacitor $C_{11}$). The transistors $Tr_{11}$ and $Tr_{21}$ and $Tr_{61}$ and $Tr_{71}$ in the first stages $1_1$ and $4_1$ of the ring counters are supplied with base currents and turned on only when all other transistors are in "off" states.

Assuming that the transistors $Tr_{11}$ and $Tr_{21}$, and $Tr_{61}$ and $Tr_{71}$ of the first stages $1_1$ and $4_1$ of the ring counters are now in their "on" states, an emitter current of the transistor $Tr_{61}$ of the first stage of the receiver B flows through the diode $D_{11}$ partially as a collector current of the transistor $Tr_{11}$ in the first stage of the transmitter A. An emitter current of the transistor $Tr_{21}$ is fed through the resistor $R_5$, the diode $D_3$ and the resistor $R_4$, but a collector voltage of the transistor $Tr_4$ in the clock pulse generating circuit 3 is a voltage determined due to resistance division by resistors $R_5$ and $R_4$. As the capacitor $C_2$ of the clock pulse generating circuit 3 is charged gradually through the resistors $R_5$ and $R_3$ and the charged potential, namely, emitter potential of the transistor $Tr_5$ becomes higher than collector potential of the transistor $Tr_4$, the transistor $Tr_5$ is turned on. This results in feeding of a base current to the transistor $Tr_4$, causing it to be turned on. By the action of this positive feedback, the charge of the capacitor $C_2$ is instantaneously discharged through the transistors $Tr_5$ and $Tr_4$.

When the transistor $Tr_4$ is turned on, the current flowing through the resistor $R_5$ and the diode $D_3$ is fully diverted to the transistor $Tr_4$, so that no current flows through the emitter of the transistor $Tr_{21}$ in the first stage $1_1$ of the ring counter, which results in turning-off of the transistor $Tr_{21}$ and the transistor $Tr_{11}$. Since a positive pulse is applied to the capacitor $C_{11}$ simultaneously with turning-off of the transistor $Tr_{11}$, a current flows through the resistor $R_{32}$. This current flows to the ground through the diode $D_{22}$, the resistor $R_4$ and the transistor $Tr_4$ when the transistor $Tr_4$ is in "on" condition, but the current flows through the resistor $R_{42}$ as a base current of the transistor $Tr_{12}$ in the second stage $1_2$ of the ring counter when the transistors $Tr_4$ and $Tr_5$ are turned off as a result of discharge of the capacitor $C_2$.

As a result, the transistor $Tr_{12}$ is turned on and accordingly, the transistor $Tr_{22}$ is also turned on. When the transistors $Tr_{12}$ and $Tr_{22}$ are turned on, voltage potential of a common line $L_1$ is lowered and the base current of the transistor $Tr_{11}$ is not supplied because it is blocked by the Zener diode $ZD_1$. This assures that the transistors $Tr_{11}$ and $Tr_{21}$ are not turned on again. Even if a positive pulse is produced on the common line $L_1$ during a transient time when the "on" position of the ring counter is shifted from the transistors $Tr_{11}$ and $Tr_{21}$ to the transistors $Tr_{12}$ and $Tr_{22}$, it will be absorbed by the capacitor $C_1$, preventing erroneous turning-on of the transistors $Tr_{11}$ and $Tr_{21}$.

The discharge of the capacitor $C_2$ is effected in an instant, so that "on" time of the transistor $Tr_4$ is very short.

Since the transistors in all stages $1_1, 1_2, \ldots 1_n$ of the transmitter A are in "off" condition so long as the transistor $Tr_4$ has been kept "off", the potential of the signal line L is raised. As a result, emitter current of the transistor $Tr_{61}$ in the first stage $4_1$ of the ring counter of the receiver B is blocked and the transistors $Tr_{61}$ and $Tr_{71}$ therein are turned off. Simultaneously with turning-off of the transistor $Tr_{61}$, a positive pulse is applied to the capacitor $C_{41}$ and supplied through the diode $D_{52}$ as a base current of the transistor $Tr_{62}$ in the second stage $4_2$ of the ring counter.

Thus, the transistor $Tr_{12}$ in the second stage $1_2$ of the ring counter of the transmitter A is turned on, so that the potential of the signal line L is lowered and, at the same time, the transistor $Tr_{62}$ in the second stage $4_2$ of the ring counter is turned on. When the transistor $Tr_{62}$ is turned on, the emitter current thereof flows through the diode $D_{12}$ partially as a collector current of the transistor $Tr_{12}$.

It is thus seen that the transistors $Tr_{12}$ and $Tr_{22}$, and $Tr_{62}$ and $Tr_{72}$ in the second stages $1_2$ and $4_2$ of the ring counters are now turned on, instead of the transistors $Tr_{11}$ and $Tr_{21}$, and $Tr_{61}$ and $Tr_{71}$, upon instantaneous turning-on of the transistor $Tr_4$ in the clock pulse generating circuit 3 or upon occurence of a clock pulse. The transistor $Tr_4$ produces clock pulses by repeatedly turning on and off at a frequency of a time constant determined by the resistor $R_3$ and the capacitor $C_2$. Thus, if a further clock pulse is produced while the transistors $Tr_{12}$ and $Tr_{22}$, and $Tr_{62}$ and $Tr_{72}$ of the second stages $1_2$, $4_2$ of the ring counters are in "on" condition, a similar operation as mentioned above is effected. Stated illustratively, said transistors $Tr_{12}$ and $Tr_{22}$, and $Tr_{62}$ and $Tr_{72}$ are turned off and the transistors in third stages (not shown) of the ring counters are turned on. Upon every occurence of subsequent clock pulses, the "on" positions of the ring counters of the transmitter A and the receiver B are shifted step by step in synchronism with each other.

When a positive pulse is applied to the capacitor $C_{1n}$ of the final stage $1_n$ of the ring counter, a base current is supplied to the transistor $Tr_3$ of the reset circuit 2 through the resistor $R_2$ to turn on said transistor $Tr_3$. Therefore, all the transistors in the stages $1_1, 1_2, \ldots 1_n$, $4_1, 4_2, \ldots 4_n$ of the transmitter A and the receiver B are turned off similarly in case the transistor $Tr_4$ in the clock pulse generating circuit 3 is turned on. After a time period determined by the time constant of the capacitor $C_{1n}$ and the resistor $R_2$, the transistor $Tr_3$ is turned off. The transistor $Tr_{11}$ whose base current is supplied through the resistor $R_3$, the diode $D_3$, the resistors $R_4$ and $R_1$ and the Zener diode $ZD_1$, and the transistor $Tr_{61}$ whose base current is supplied through the resistors $R_6$ and $R_7$ and the Zener diode $ZD_2$, are then turned on simultaneously, whereby the transistors $Tr_{61}$ and $Tr_{71}$ are also turned on, restoring the apparatus into the original condition. Thus, similar operation is repeatedly performed.

At the starting of the apparatus, if the transistors $Tr_{12}$ and $Tr_{22}$ in the second stage $1_2$ of the ring counter of the transmitter A are in "on" condition and the transistors $Tr_{61}$ and $Tr_{71}$ in the first stage $4_1$ of the ring counter of the receiver B are in "on" position, in the transmitter A, the transistors in the third stage of the ring counter and in the receiver B, the transistors $Tr_{62}$ and $Tr_{72}$ in the second stage $4_2$ of the ring counter are turned on upon the occurence of the next clock pulse. Similarly, the "on" positions of the ring counters are shifted step by step until the transistors $Tr_{1n}$ and $Tr_{2n}$ in the final stage $1_n$ of the transmitter A, and the transistors in the stage immediately preceding the final stage $4_n$ of the ring counter in the receiver B are turned on. In this condition, if a clock pulse is produced, the transistors $Tr_{1n}$ and $Tr_{2n}$ and the transistors in the stage immediately preceding the final stage $4_n$ of the receiver B are turned off. With these transistors turned off, the transistor $Tr_3$ in the resetting circuit 2 is turned on. The transistor $Tr_{6n}$ tends to be turned on by a base current supplied from the capacitor $C_{4n-1}$ but it is kept in "off" condition so long as the transistor $Tr_3$ is turned on. By selecting the time constant determined by the capacitor $C_{1n}$ and the resistor $R_2$ substantially larger than the time constant determined by the capacitor $C_{4n-1}$ and the resistor $R_{9n}$, the charge of the capacitor $C_{4n-1}$ will complete its discharge through the diode $D_{5n}$ and the resistor $R_{9n}$ while the transistor $Tr_3$ is in "on" condition, so that the transistor $Tr_{6n}$ in the final stage $4_n$ of the ring counter will no longer be turned on.

It is thus seen that it is the transistors $Tr_{11}$, $Tr_{21}$ and $Tr_{61}$, $Tr_{71}$ in the first stages $1_1$ and $4_1$ of ring counters of both the transmitter A and the receiver B that are to be turned on when the transistor $Tr_3$ is deenergized again.

Though the foregoing description is given concerning the operation which is started under the condition that in the transmitter A, the transistors $Tr_{12}$ and $Tr_{22}$ in the second stage $1_2$ of the ring counter are turned on and in the receiver B, the transistors $Tr_{61}$ and $Tr_{71}$ in the first stage $4_1$ of the ring counter are turned on, similar operations can be seen in other cases. Stated illustratively, in case transistors in other stages of the ring counters are randomly in "on" condition at the starting time of the operation, or in case some transistors are randomly turned on, during the operation, due to some possible noise, the "on" positions of the ring counters are sequentially shifted until the transistors $Tr_{1n}$ and $Tr_{2n}$ in the last stage $1_n$ of the transmitter A are turned on and turned off again thereafter to energize the transistor $Tr_3$ in the resetting circuit 2. All transistors other than the transistors $Tr_{11}$ and $Tr_{21}$, and $Tr_{61}$ and $Tr_{71}$ in the first stages of the ring counters are kept in "off" condition, whatever the condition of the ring counters may be immediately before such turning-on of the transistor $Tr_3$, if the turning-on period of time of said transistor $Tr_3$ is sufficiently long. Accordingly, when the transistor $Tr_3$ is then deenergized, the transistors $Tr_{11}$ and $Tr_{21}$, and $Tr_{61}$ and $Tr_{71}$ are necessarily turned on, thereafter permitting sequential shifting of "on" positions of the ring counters in synchronism with each other.

Signal transmission will now be described. When the transistors $Tr_{11}$ and $Tr_{21}$, $Tr_{61}$ and $Tr_{71}$ of the first stages $1_1$ and $4_1$ of the ring counters of the transmitter A and the receiver B are in "on" condition and fully saturated and if the value of the resistor $R_{81}$ is chosen substantially larger than that of the resistor $R_{11}$, the collector voltage of the transistor $Tr_{11}$ will be determined through voltage division by the resistor $R_{11}$ and the variable resistor $VR_1$. On the other hand, since the transistor $Tr_{61}$ is also turned on, the collector voltage of the transistor $Tr_{61}$ is the sum of the collector voltage of the transistor $Tr_{11}$ and a threshold voltage of the diode $D_{11}$. Therefore, the collector voltage of the transistor $Tr_{61}$ will be proportional to the resistance value of the variable resistor $VR_1$. In other words, the output voltage of the receiver B is proportional to the resistance value of the variable resistor $VR_1$ of the transmitter A.

A similar effect can be seen in the second stage $4_2$ of the ring counter in the receiver B. Stated illustratively, the collector voltage of the transistor $TR_{62}$ is proportional to the resistance value of the variable resistor $VR_2$ when the transistor $TR_{12}$ of the second stage $1_2$ of the ring counter of the transmitter A are in "on" condition. Similarly, the output voltage in each stage of the ring counter in the receiver B is proportional to the resistance value of the variable resistor in the same stage of the transmitter A. With the circuit illustrated, transmittable voltage value is in the order of one third of the power supply voltage.

Figure 2:
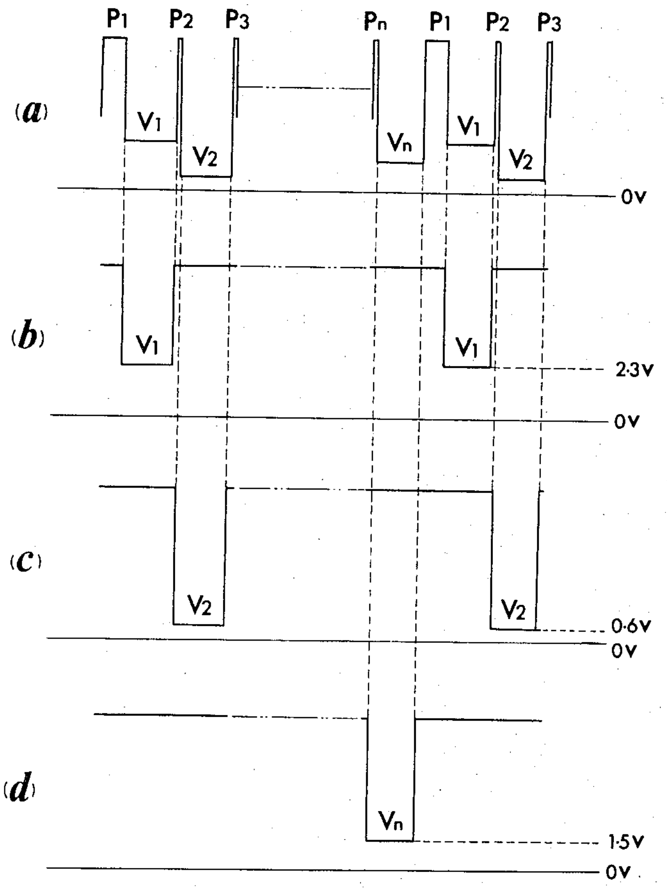
FIG. 2 shows voltage waveforms at various points in the above circuit.

The embodiment described above will now be explained more particularly with reference to FIG. 2 which shows voltage waveforms at various points in the circuits. Assuming that the voltage of the power supply E of the transmitter A is 10V, resistance values of the resistors $R_{11}$, $R_{12}$, . . . and $R_{1n}$ are 1KΩ, resistance value of the variable resistor $VR_1$ is 200Ω, resistance value of the $VR_2$ is 0Ω and resistance value of the $VR_n$ is 100Ω, then the voltage waveform as shown in FIG. 2*a* appears on the signal line L. The pulse $P_1$ is a resetting pulse produced when the transistor $Tr_3$ of the resetting circuit 2 is turned on, $V_1$ is a voltage appearing on the signal line L when the first stage $1_1$ of the ring counter is turned on. Similarly, $V_2$, $V_n$ are voltages appearing on the signal line L when the second stage $1_2$ and the final stage $1_n$ are in "on" conditions, respectively. $P_2$, $P_3$ and $P_n$ are clock pulses appearing on the signal line L whenever the transistor $Tr_4$ of the clock pulse generator B is turned on. FIG. 2*b* shows a collector voltage waveform of the transistor $Tr_{62}$ in the first stage $4_1$ of the ring counter of the receiver B. The low voltage level thereof is at 2.3V which is the sum of 1.7V determined through resistor division by the resistor $R_{11}$ and the variable resistor $VR_1$ in the first stage $1_1$ of the transmitter A, and 0.6 V of threshold voltage of the diode $D_{11}$. The high voltage level thereof is at 10V of the power supply voltage, which shows the transistor $Tr_{61}$ is in "off" state.

FIG. 2*c* shows collector voltage waveform of the transistor $Vr_{62}$ in the second stage $4_2$ of the ring counter of the receiver B. The low voltage level is at 0.6V which corresponds to threshold voltage of the diode $D_{12}$ because the emitter of the transistor $Tr_{12}$ in the second stage $1_2$ of the ring counter of the transmitter A is grounded. The high voltage level is at 10V of the power supply voltage as in the previous case.

FIG. 2*d* shows collector voltage waveform of the transistor $Tr_{6n}$ in the final stage $4_n$ of the ring counter of the receiver B. The low voltage level is at 1.5V which is the sum of 0.9V of resistance division value of the resistor $R_{1n}$ and the variable resistor $VR_n$ in the final stage $1_n$ of the transmitter A and 0.6V of the threshold voltage of the diode $D_{1n}$. The high voltage level is at 10V of the power supply voltage.

As has been described above, voltage pulses the magnitudes of which are proportional to the resistance values of the variable resistors $VR_1$, $VR_2$, . . . and $VR_n$ connected to the respective stages $1_1$, $1_2$, . . . and $1_n$ of the ring counter of the transmitter A appear at respective outputs of the stages $4_1$, $4_2$, . . . $4_n$ of the ring counter of the receiver B. Application examples of the present invention will be given in the following.

One application example in which temperature is collectively detected is first explained. A thermistor is connected in place of the variable resistor $VR_1$, $VR_2$, . . . $VR_n$ in respective stage $1_1$, $1_2$, . . . $1_n$ of the ring counter of the transmitter A, and a cathode of a diode $D_{111}$ in the circuit shown in FIG. 3 is connected to each of the collectors of the transistors $Tr_{61}$, $Tr_{62}$, . . . $Tr_{6n}$ of the stages $4_1$, $4_2$, . . . $4_n$ of the receiver B. An output circuit including the diode $D_{111}$ is composed of a transistor $Tr_{111}$, resistors $R_{111}$ and $R_{112}$, and a capacitor $C_{111}$. If the time constant determined by the resistor $R_{111}$ and the capacitor $C_{111}$ is chosen sufficiently longer than the period of the ring counter, the base voltage of the transistor $Tr_{111}$ depends upon a low level of cathode potential of the diode $D_{111}$ or the signal voltage. Accordingly, by installing thermistors at positions where detection of temperature is desired, the temperature at those positions may be detected as output voltage of the output transistor $Tr_{111}$ of each stage in the receiver B.

With the above-mentioned circuit arrangement, heat generation of a number of motors or the like in a factory or the like may be collectively monitored and accident due to possible overheat of the motor can be well prevented.

Another application example in which analogue voltages are transmitted will be described hereunder. An emitter of a transistor $Tr_{121}$ of a circuit shown in FIG. 4 is connected in place of variable resistors $VR_1$, $VR_2$, . . . $VR_n$ in the stages $1_1$, $1_2$, . . . $1_n$ of the ring counter of the transmitter A. A resistor $R_{121}$ is connected between the emitter of the transistor $Tr_{121}$ and the ground. By making the emitter currents of the transistors $Tr_{11}$, $Tr_{12}$, . . . $Tr_{1n}$ and the resistance of the resistor $R_{121}$ sufficiently small, the emitter voltage of the transistor $Tr_{121}$ is a difference between a signal voltage applied to the base of the transistor $Tr_{121}$ and the voltage across the base and emitter of the transistor $Tr_{121}$, irrespective of a current from the ring counter. This voltage is transmitted through the signal line L to collectors of the transistors $Tr_{61}$, $Tr_{62}$, . . . $Tr_{6n}$ of the ring counter stages $4_1$, $4_2$, . . . $4_n$ of the receiver B. Thus, by connecting the cathode of the diode $D_{111}$ of the circuit shown in FIG. 3 to respective collector of the transistors $Tr_{61}$, $Tr_{62}$, . . . $Tr_{6n}$, the voltage proportional to the respective signal voltage applied to the base of the transistor $Tr_{121}$ connected to the respective stage of the ring counter of the transmitter A appears at the output of the transistor $Tr_{111}$.

With the circuit arrangement described above, it is possible to collectively monitor pulsations per unit time period of a number of patients with advanced diseases in a hospital by converting the pulsations to voltages, whereby early detection of an abnormal patient is assured.

Other application example in which a number of loads (such as relays) are remotely controlled is explained hereinbelow. A movable contact of three-contact switch S in the circuit shown in FIG. 5 is connected in place of each of the variable resistors $VR_1$, $VR_2$, . . . $VR_n$ in the stages $1_1$, $1_2$, . . . $1_n$ of the ring counter of the transmitter A. Between fixed contacts of the switch S and the ground, a first fixed contact $S_1$ is directed grounded, a second fixed contact $S_2$ is grounded via a resistor $R_{131}$, and a third fixed contact $S_3$ is grounded via a resistor $R_{132}$. To a cathode of a diode $D_{141}$ of the circuit shown in FIG. 6 is connected each of the collectors $Tr_{61}$, $Tr_{62}$, . . . $Tr_{6n}$ of the stages $4_1$, $4_2$, . . . $4_n$ of the ring counter of the receiver B. A drive circuit including the diode $D_{141}$ is composed of transistors $Tr_{141}$ to $Tr_{143}$, resistors $R_{141}$ to $R_{145}$, capacitors $C_{141}$ to $C_{143}$, diodes $D_{142}$ to $D_{150}$ and relays $Y_1$ and $Y_2$.

For the purpose of clarification of the description, explanation is directed to the first stages of the transmitter A and the receiver B, and it is assumed that the resistor $R_{131}$ is of 200Ω, $R_{132}$ is of 100Ω, $R_{11}$ is of 1KΩ, $R_{31}$ is of 10KΩ and the power supply voltage is 10V.

When the movable contact of the switch S is placed to a position of the first fixed contact $S_1$, the emitter of the transistor $Tr_{11}$ is directly grounded so that the collector voltage of the transistor $Tr_{61}$ is 0.6V of the low level as shown in FIG. 2c, which is seen from the description of the circuit of FIG. 1. Thus when the cathode voltage of the diode $D_{141}$ of the driver circuit is 0.6V of the low level, the charge in the capacitor $C_{141}$ is almost fully discharged through the diode $D_{141}$ and the transistor $Tr_{141}$ is deenergized. If the time constant of the resistor $R_{141}$ and the capacitor $C_{141}$ is sufficiently large, the current flowing through the resistor $R_{141}$ charges the capacitor $C_{141}$ even if the cathode potential of the diode $D_{141}$ increases to the high level corresponding to the power supply voltage. Thus, the transistor $Tr_{141}$ remains in its "off" state without turning on. When the cathode potential of the diode $D_{141}$ becomes the low level, the charge in the capacitor $C_{141}$ is discharged through the diode $D_{141}$ so that no base current flows into the transistor $Tr_{141}$, keeping it in its "off" state. With the transistor $Tr_{141}$ being always in its "off" state, the base current of the transistor $Tr_{142}$ is supplied via the diode $D_{145}$, so that the transistor $Tr_{142}$ is turned on. Thus, the relay $Y_1$ is actuated and the load connected to the contacts of the relay $Y_1$ may be controlled. On the other hand, since the base current of the transistor $Tr_{143}$ is blocked by the capacitor $C_{142}$, said transistor $Tr_{143}$ is not turned on and the relay $Y_2$ is not actuated.

When the movable contact of the switch S is connected to the second fixed contact $S_2$, the emitter of the transistor $Tr_{11}$ is connected to the ground through 200Ω of emitter resistor $R_{131}$, so that the collector voltage of the transistor $Tr_{61}$ is at 2.3V of the low level as shown in FIG. 2b, which is seen from the description of the circuit of FIG. 1. In order to turn off the transistor $Tr_{141}$, the base potential thereof must be below 2.4V which is the sum of the threshold voltages (3 × 0.6V) of the diodes $D_{142}$, $D_{143}$ and $D_{144}$ and 0.6V of threshold voltage of the transistor $Tr_{141}$. Therefore, unless the cathode potential of the diode $D_{141}$ is below 1.8V, which is a difference between 2.4V and 0.6V of threshold voltage of the diode $D_{141}$, the transistor $Tr_{141}$ will not be turned off. Therefore, under the conditions, the current supplied through the resistor $R_{141}$ flows into the base of the transistor $Tr_{141}$, keeping said transistor $Tr_{141}$ in "on" condition. Accordingly, no current is supplied to the bases of the transistors $Tr_{142}$ and $Tr_{143}$ and they remains in their "off" states. The relays $Y_1$, $Y_2$ are, therefore, not actuated.

When the movable contact of the switch S is connected to the third fixed contact $S_3$, the emitter of the transistor $Tr_{11}$ is grounded via 100Ω of the resistor $R_{132}$, so that the collector voltage of the transistor $Tr_{61}$ is at 1.5V of the low level as shown in FIG. 2d. When the cathode potential of the diode $D_{141}$ is at 1.5V of the low level, the charge in the capacitor $C_{141}$ is discharged until the voltage at anode side reaches about 2.1V, when the transistor $Tr_{141}$ is turned off. Since the voltage at anode side of the capacitor $C_{141}$ is sufficiently high as compared with the case where the movable contact is connected to the first fixed contact $S_1$, the capacitor $C_{141}$ is charged through the resistor $R_{141}$ when the cathode potential of the diode $D_{141}$ becomes high level corresponding to the power supply voltage. The time period required to reach the voltage enough to turn on the transistor $Tr_{141}$ is sufficiently shorter as compared with the case where the movable contact is connected to the first fixed contact $S_1$.

Therefore, before the cathode potential of the diode $D_{141}$ has been reduced to the low level again, the transistor $Tr_{141}$ is turned on. Thereafter, when the cathode potential of the diode $D_{141}$ is lowered to the low level, the transistor $Tr_{141}$ is turned off. Thus, the transistor $Tr_{141}$ repeats its "on" and "off" states, whereby the base current is supplied to the transistor $Tr_{143}$ through the action of the capacitors $C_{142}$ and $C_{143}$ and the diodes $D_{149}$ and $D_{150}$ which constitute a D.C. restoration and an integration circuit, keeping said transistor $Tr_{143}$ in its "on" state. The relay $Y_2$ is accordingly driven and the load connected to the contact thereof may be controlled.

With the transistor $Tr_{143}$ kept in its "on" state, the current supplied through the resistors $R_{142}$ and $R_{143}$ when the transistor $Tr_{141}$ is in its "off" state, flows mostly through the diode $D_{142}$ and the transistor $Tr_{143}$, so that the transistor $Tr_{142}$ is kept in its "off" state. The relay $Y_1$ is, therefore, not actuated.

The circuit arrangement described above can be employed in an automobile with great advantages, where wiring is extremely complicated for connecting various kinds of switches to various loads. Stated illustratively, with such a circuit arrangement, the switches can be coupled with the loads through a single signal line and a single power line. Accordingly, wiring work in manufacturing process is much simplified, possible miswiring is well avoided and risk of wire breakage or shortcircuit is by far reduced.

In the embodiments of FIGS. 5 and 6 as mentioned above, the first stages $1_1$ and $4_1$ of the ring counters were explained particularly. However, it should be understood that by connecting the switch of FIG. 5 and the driver circuit of FIG. 6 to each of the second to *n*-th stages, 2*n* relays can be controlled by *n* stages.

It should also be understood that ring counters using flip-flop, SCR or the like may be employed in place of the ring counters used in the embodiment of FIG. 1, for the same purpose.

As has been fully described hereinabove, the present invention is characterized by the transmitter comprising the *n*-stage ring counter, the clock pulse generating circuit and the resetting circuit, and the receiver comprising the ring counter, the transmitter and the receiver being coupled through a single signal line, "on" positions of the ring counters in the transmitter and the receiver being sequentially shifted with the clock pulses supplied by the clock pulse generating circuit and both ring counters being synchronized with respect to their "on" positions by reset pulse from the resetting circuit. In this way, an output of each stage of the transmitter is transmitted to a corresponding stage of the receiver, permitting multiplex transmission of a multiple of signals through a single signal line. Since the present system can transmit voltage signals corresponding to resistance values or voltage signals corresponding to analogue voltage values, it may be employable for various purposes, such as central monitoring of temperature, detection of analogue values in which a number of parameters change continuously, and separate control for a number of loads. The number of stages of the ring counter may be selected arbitrarily depending upon the number of signals to be transmitted. Furthermore, since only simple circuits are used in the present apparatus, manufacturing cost is by far reduced as compared with a convertional apparatus for multiplex transmission of electrical signals.

What is claimed is:

1. A multiplex transmission system for electrical signals, comprising in combination:

a transmitter comprising a ring counter having *n* stages;

a receiver comprising a further ring counter having *n* stages;

said *n* transmitter ring counter stages each having electronic switch means for converting a corresponding one of *n* input electrical signals to an output voltage of the respective stage;

periodic pulse generating means connected to the stages of one said ring counter for sequentially shifting stage activation therein;

a single signal line and means collectively connecting said *n* transmitter stages to said *n* receiver stages through said single signal line for shifting stage activation of said other ring counter in synchronism with said shifting in said one ring counter, each of said receiver ring counter stages having electronic switch means connected to said single signal line and responsive to said output voltage of the corresponding transmitter stage for providing an output corresponding to the respective input electrical signal;

to thereby sequentially transmit through a single line the signal inputs to sequentially activated transmitter stages to outputs of correspondingly sequentially actuated receiver stages.

2. The system of claim 1 in which said electronic switch means of each said stage comprises first and second opposite polarity electronic devices coupled in a feedback loop, and including capacitive coupling means between the first electronic devices of adjacent stages for activating one stage in response to deactivation of the preceeding stage, said first electronic devices of said receiver stages being connected to said single signal line, said transmitter stages each including unidirectional conducting means for connecting the respective first electronic device thereof to said single signal line.

3. The system of claim 2 in which said periodic pulse generating means include further electronic switch means coupled to said electronic devices of said transmitter stages for deactivating activated ones thereof so as to produce a corresponding pulse on said single signal line.

4. The apparatus of claim 3 in which said electronic switch means of each stage of said transmitter includes means connecting the corresponding input electrical signal in series with said first electronic device and said unidirectional conducting means of said transmitter stage for correspondingly varying the voltage on said single signal line in response to activation of said stage, the corresponding receiver stage having an output terminal associated with the side of the first electronic device thereof opposite that side connected to said single signal line.

5. An apparatus for multiplex transmission of electrical signals, comprising in combination:

a transmitter having an *n*-stage ring counter, each stage including a source for providing a signal amplitude to be transmitted, a decoupling element and a first electronic switching means actuable for serially connecting said source to said decoupling element, each said stage further including a second electronic switching means connected to said first electronic switching means for terminating conduction therethrough;

a single signal line connected to the decoupling element of each of said stages;

a receiver having a further $n$-stage ring counter, each stage including a third electronic switching means and further including a fourth electronic switching means connected to said third electronic switching means for terminating conduction therethrough, each of said third electronic switching means being connected to said signal line for producing an output corresponding to the source signal amplitude of the corresponding transmitter stage and for synchronizing advancement of said receiver and transmitter stages;

pulse generator means connected commonly to the stages of one of said ring counters for sequentially advancing stage actuation in said one ring counter;

whereby a signal from said source applied to one said first electronic switching means of said transmitter results in a corresponding output signal on the corresponding third electronic switching means of said receiver.

6. An apparatus as claimed in claim 5 in which said first and second electronic switching means are respectively NPN and PNP transistors, said source being connected to the emitter of said NPN transistor, said decoupling elements being respectively connected to the collectors of said NPN transistors of each stage of said transmitter ring counter, said third and fourth electronic switching means being respectively NPN and PNP transistors, the emitters of said NPN transistors of said receiver being each connected to said single signal line, said pulse generating means including a clock-pulse generator and a reset-pulse generator cooperative therewith, said signal from said source in a given transmitter stage being coupled to the emitter of the NPN transistor of said given transmitter stage and appearing as a corresponding collector voltage of the NPN transistor of the corresponding receiver ring counter stage.

7. An apparatus as claimed in claim 6 including variable resistor means in series with respective ones of said NPN transistors of said transmitter and coupled to the emitters thereof, said resistor means being variable in resistance as a measure of a parameter to be transmitted, an output transistor for each receiver stage and unidirectional conducting means coupling an input electrode of said output transistor to the collector of the NPN transistor of the corresponding receiver stage, a time constant circuit connected to said output transistor and having a time constant longer than the period of the receiver ring counter for causing the output voltage of said output transistor to represent the resistance of the variable resistor means of the corresponding transmitter stage.

8. An apparatus as claimed in claim 6 including a signal voltage input transistor for at least one stage of said transmitter ring counter and means coupling the emitter potential of said signal voltage transistor to the first electronic switching means of said stage, the corresponding stage of said receiver ring counter including means for providing as an output a voltage proportional to the signal voltage applied to said signal voltage input transistor.

9. An apparatus as claimed in claim 6 in which said transmitter ring counter includes, in at least one stage thereof, a multicontact switch having a movable contact coupled to the other side of the corresponding one of said first electronic switching means, said switch having fixed contacts and selected resistances connected thereto for alternative selection by said movable contact, the corresponding stage of said receiver ring counter including first and second relays and respective first and second relay drive transistors in series therewith, an input transistor, unidirectional voltage dropping means coupling the base of said input transistor to the other side of the first electronic switching means of the corresponding receiver ring counter stage, an RC time base network for said input transistor, a voltage divider paralleling said RC network, said input transistor being connected at one side to a point intermediate the ends of said voltage divider and being coupled at the other side thereof to further voltage dropping means, means coupling spaced points on said voltage divider to the bases of said first and second drive transistors for energizing said relays in differing combinations dependent upon the position selected for the movable contact of said switch in said transmitter stage.

10. An apparatus as claimed in claim 5, wherein said pulse generating means includes reset circuit means responsive to completion of operation of the $n^{th}$ transmitter ring counter stage for applying a reset-pulse to said signal line and deenergizing all stages of said transmitter and receiver ring counters except the first stages of each, said pulse generating means further including resetting periodically actuated clock-pulse generating means for sequentially shifting the "on" position of the transmitter ring counter by one stage while applying a clock-pulse to said signal line for synchronously shifting the "on" position of said receiver ring counter by one stage.

11. An apparatus as claimed in claim 5, wherein said sources comprise $n$ electrical resistors coupled in circuit with respective first electronic switching means for causing said respective first electronic switching means to convert $n$ electrical signals appearing across said $n$ electrical resistors to output voltages of respective stages of said transmitter, for sequential application to said signal line.

12. An apparatus as claimed in claim 5, wherein said sources comprise $n$ analogue voltage sources coupled to respective first electronic switching means for causing $n$ electrical signals supplied thereby to be converted by said first electronic switching means to output voltages sequentially appearing on said signal line.

13. An apparatus as claimed in claim 5, in which said sources comprise at least $n$ resistors and multipole switch means associated with said $n$ resistors and switchable for selectively varying the resistance values of said resistors, said receiver including a plurality of relays and driver circuits for said relays connected to outputs of the respective stages of said receiver ring counter, resistance values corresponding to the positions of said switch means being converted to output voltages of the transmitter ring counter, and means connecting said driver circuits for respective stages of said receiver ring counter for driving loads in correspondence to the positions of said switch means.

* * * * *